July 1, 1969     J. L. ARROWOOD ET AL     3,453,050

TRACE SCANNING

Filed Oct. 11, 1965

INVENTORS.
Joseph L. Arrowood
BY Wayne A. Groppe
William W. Lee, Jr.

ATTORNEY.

United States Patent Office 3,453,050
Patented July 1, 1969

3,453,050
TRACE SCANNING
Joseph L. Arrowood, Wayne A. Groppe, and William W. Lee, Jr., Oak Ridge, Tenn., assignors to the United States of America as represented by the United States Atomic Energy Commission
Filed Oct. 11, 1965, Ser. No. 494,985
Int. Cl. G01b 11/24
U.S. Cl. 356—167                   1 Claim

ABSTRACT OF THE DISCLOSURE

The evaluation of data recorded on film is facilitated by employing an electrical scanning system which is capable of accurately reading and recording the data. The spatial relationship on the film of a data line to a reference line is electrically measured by employing a train of timing pulses of a fixed frequency with the number of pulses between the data line and the reference line being indicative of the spacing between the lines.

---

The invention described herein was made in the course of, or under, a contract with the U.S. Atomic Energy Commission. This invention relates generally to trace scanning by electrical means and more particularly to an electrical system for reading and recording data previously recorded on photographic film.

Time-dependent transient phenomena such as an image traced by an electron beam on a radar screen or on a cathode-ray oscilloscope may be recorded on film for subsequent review and interpretation. Frequently, visual examination of this film and qualitative evaluation of the data thereon are sufficient to accomplish the desired analysis. However, in some instances detailed quantitative information is required from these traces, but with the small over-all vertical scale possible on these traces and the finite line width obtainable, conventional techniques of measuring are difficult, time consuming, and often subject to human error, which prevents these tracings from being highly reproducible. For example, consider the difficulties inherent in making visual measurements by superimposing an accurately constructed, transparent grid over a tracing recorded on film, e.g., an oscillogram.

The present invention aims to obviate or minimize the above and other problems previously encountered in obtaining detailed quantitative information from tracings on photographic film by providing an electrical system capable of reading and recording such information in a rapid, economical, accurate, and automatic manner. The system accomplishes these results by electrically measuring the spatial relationship of a reference line to a data line by using a train of timing pulses of fixed frequency with the number of pulses between the reference line and data line being proportional to the spacing between the lines.

An object of the present invention is to provide for the reduction and recordation of data in an improved, efficient accurate, and economical manner.

Another object of the present invention is to provide a new and improved electrical system capable of electrically measuring and recording data from previously recorded traces.

A further object of the present invention is to automatically read data recorded on photographic film and reduce the reading to a permanent, readily translatable record.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

While the following description of the present invention is directed primarily to the reduction of data representing an event on an oscilloscope that has been previously recorded on film in the form of an oscillogram, it is to be understood that other data such as filmed radar beam traces, cloud chamber events, X-ray tracings, etc., may be read and recorded by the present invention.

Figure 1:
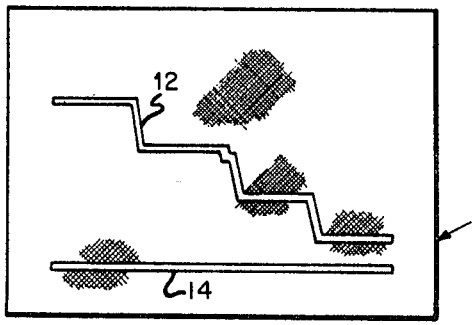
FIG. 1 shows a photographic oscillogram with recorded data thereon.

Referring to FIG. 1 there is shown an oscillogram 10 in the form of a positive transparency or film having information recorded thereon including a data curve or trace 12 to be analyzed and a reference trace 14 formed on the film in any suitable manner at a location spaced from the data trace 12 and preferably disposed along a straight line. The data and reference traces provide transparent sections in an otherwise opaque film body. Also, the data trace 12 may be of any shape representative of an event viewed on an oscilloscope that has been recorded on film of any suitable type.

Figure 2:
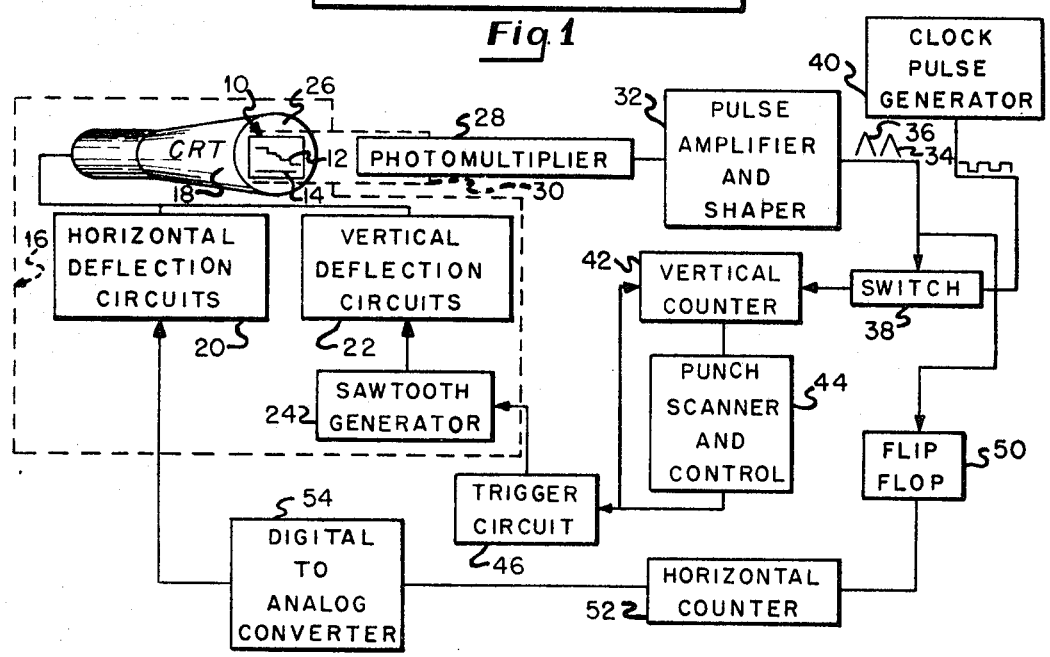
FIG. 2 is a diagrammatical view showing the electrical system of the present invention that is capable of reading and recording filmed data.

When it is desired to analyze the data trace 12, the electrical film reading system of the present invention as shown in FIG. 2 may be utilized. This film reading system is shown comprising a synchronous oscilloscope generally indicated at 16 and including a cathode-ray tube 18, horizontal and vertical deflection circuits 20 and 22, respectively, and a sawtooth generator 24 coupled to the vertical deflection circuit 22. The oscilloscope may be of any suitable type that is capable of successively illuminating spots or points on either the vertical or horizontal axis of the cathode-ray tube display or window 26. For example, a suitable commercially available cathode-ray tube which may be used with satisfactory results may have a window area of about 90 square inches containing about one million points with the tube illuminating each point or spot at the rate of about one every 50 microseconds.

In order to analyze data recorded on the film 10, the latter is preferably mounted flush upon the cathode-ray tube window 26 and so positioned that the base or reference trace 14 is below or above the data trace 12 and in a parallel relationship with a horizontal sweep path of tube 18. For convenience of discussion, portions of the following description will be directed to film wherein the reference line is below the data line. The oscilloscope is set in an initial data analyzing setting so that the point illumination begins at the lower left side of the cathode-ray tube window 26 as viewed in FIG. 2. Also, the circuitry of the oscilloscope is arranged so that the points are successively illuminated in a vertical direction, i.e., perpendicular to the reference trace 14 on the film 10, by actuating the sawtooth generator 24.

Light provided by the cathode-ray tube spots that is transmitted through the transparent sections of the film is sensed by a suitable photoelectric cell, e.g., photomultiplier tube 28, disposed in the projection of the light beam emanating from the cathode-ray tube window 26. A suitable light impervious shield such as generally indicated at 30 is preferably disposed about the sensing end of the photomultiplier tube 28 and extends to the cathode-ray tube window 26 where it is preferably in a contiguous relationship with peripheral or marginal surfaces of the film 10 to assure that only the light transmitted through the reference and data lines or traces on the film is sensed by the photomultiplier tube 28.

A vertical sweep of the oscilloscope beam across the film in an upward direction will cause two successive pulses of light to be transmitted to the photomultiplier tube 28. The first light pulse occurs as the beam crosses the reference trace 14 while the second light pulse occurs at a later time as the beam crosses the data trace 12. These light pulses are converted to discrete electrical outputs by the photomultiplier tube 28 and are fed into a suitable pulse-shaping and amplifying circuit 32. The output from circuit 32 comprises a "start" pulse 34 and a "stop" pulse 36 which correspond to the first and second light pulses, respectively.

A gating circuit or switch 38 is connected to the pulse-shaping and amplifying circuit 32 and a suitable pulse generator, e.g., a time base oscillator 40, which, in turn, may be coupled through the switch 38 to a pulse counter 42 such as a binary coded decimal counter of any suitable construction. The gating circuit 38 may be any suitable switching mechanism that is capable of coupling the timed pulses from the oscillator 40 to the counter 42 in response to a first signal (start pulse) and terminating the coupling in response to a second signal (stop pulse). Thus, the number of timed pulses registered by the counter 42 is proportional to the lapsed time between the first and second light pulses, and therefore to the distance between the reference and data lines or traces 14 and 12, respectively.

When the counter 42 stops counting the timed pulses resulting from a single vertical sweep of beam in the cathode-ray tube 18, the number of pulses registered in the counter 42 is recorded in any suitable manner prior to a subsequent vertical sweep. To achieve this recordation of the counted pulses, a suitable punch scanning and control circuit 44 may be connected to the counter and be actuated to punch into paper tape or the like the contents of the counter 42.

After the pulses are recorded on paper tape, the control circuit 44 signals the counter 42 through another connection to clear its registers for receiving and counting a subsequent timed pulse train.

A trigger circuit 46 may be connected between the sawtooth generator 24 and the control circuit 44 for actuation by the latter during the resetting of the counter to again initiate operation of the generator 24 for effecting a second vertical sweep of the oscilloscope beam across the film 10 at a location adjacent to and along a path parallel to the first beam.

In order to horizontally advance the location of the oscilloscope beam prior to each vertical sweep, a bistable multivibrator or flip-flop 50 may be connected to the output of the pulse amplifying circuit 32 and be responsive to alternate pulses therefrom corresponding to stop pulses 36 for signalling a counter circuit 52 through a suitable connection to advance its registered count by one increment. This counter circuit 52, which may be of a type similar to counter 42, provides an output signal upon receiving a signal from the flip-flop 50 that is directed to a digital-to-analog converter 54. This converter 54, which may be of any suitable type, in turn, generates an analog voltage proportional to the number of counts registered in counter 52 and is coupled to the horizontal deflection circuits 20 of the oscilloscope to index the oscilloscope beam in a horizontal direction. This horizontal displacement of the beam prior to each vertical sweep may be of any desired distance which is capable of providing a satisfactory analysis of the data recorded on the film 10.

Figure 3:
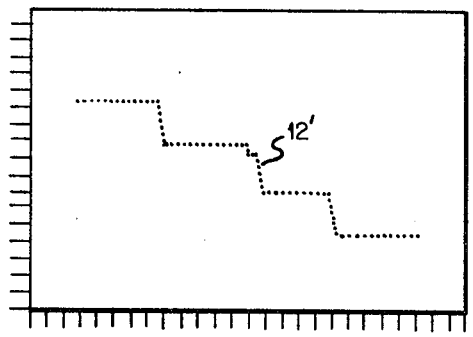
FIG. 3 shows a plot of points that may be reduced from an oscillogram as in FIG. 1 by the electrical system of FIG. 2.

When the above-described system completes a desired number of vertical sweeps the punch scanner and control circuit may be utilized to energize a suitable "print-out" mechanism (not shown) for printing the recorded data in the form of a readily measurable plot such as shown in FIG. 3 at 12′. Or, if desired, the recorded information from the print-out mechanism may be entered on cards or tape suitable for analysis by an electronic computer.

In a typical operation the data trace 12 on the film 10 may run roughly parallel to the base or reference line 14 while being spaced therefrom a distance ranging from about 0.5 centimeter (cm.) to about 4 cm. The data reading system of the present invention may be "set" to provide a desired number of vertical sweeps—say, for example, 128, over a horizontal distance of about 8.5 cm. The oscillator 40 may be adjusted to provide a desired number of pulses for each centimeter of travel by the cathode-ray tube beam. For example, 166 pulses for each centimeter of beam travel is sufficient to provide the system with satisfactory data reading capabilities. The resolution of this system is sufficient to measure reference line-to-data line spacings as small as about 0.15 cm.

While the film data reading system described above is directed to vertical sweep measurements by the oscilloscope, it should be understood that horizontal sweep measurements may be provided by rotating the film 90° from the position shown in FIG. 2 and interchanging the output connections of the sawtooth generator 24 and the converter 54. Also, the converter 54 may be replaced with a suitable stepping switch capable of advancing the oscilloscope beam in the desired direction. Lockout circuits may be provided so that, if either trace is too obscure to read or not present, the counter 42 will reset and effect the punching of zeros which are easily revealed during a rapid scan of the data.

It will be seen that the present invention sets forth an improved system for electrically reading and recording data previously recorded on film at a rate substantially faster than that attainable by conventional techniques. For example, the present system requires less than one minute to read an oscillogram of the type described above and record the results on punched tape, whereas as many as eight hours are normally required by a human operator to accomplish the same objectives using conventional grid techniques. The reproducibility of the present system is about 0.5 percent which is sufficiently high to provide acceptable data in most cases.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

What is claimed is:

1. A scanning system for electrically measuring distances between spaced-apart transparent sections of an opaque body, comprising means for sweeping a luminous spot in a linear direction across a portion of a substantially opaque body, light sensitive means disposed in the projection of the luminous spot for generating first and second electrical signals when the luminous spot sequentially intercepts and projects through spaced-apart transparent sections of the opaque body, electrical means for generating a train of electrical pulses at a predetermined frequency, pulse counting means, switch means connected to said light sensitive means and actuatable in response to said first signal for coupling said pulses to the counting means to initiate the counting of said pulses and further actuatable in response to said second signal for terminating said coupling to stop said pulse counting with the number of pulses counted being indicative of the spacing between said transparent sections on the portion of the opaque body traversed by the luminous spot, further switch means coupled to said light sensitive means for receiving said electrical signals and actuatable in response to said second signal for transmitting the latter, and circuit means connected between said further switch means and the means for sweeping the luminous spot and actuatable in response to said second signal transmitted from said further switch means for displacing the luminous spot a predetermined distance in a direction perpendicular to said linear direction.

References Cited

UNITED STATES PATENTS

| | | | |
|---|---|---|---|
| 2,494,441 | 1/1950 | Hillier | 235—92 |
| 2,932,016 | 4/1960 | Dayonnet et al. | 340—345 |
| 3,335,408 | 8/1967 | Oliver. | |

MAYNARD R. WILBUR, *Primary Examiner.*

THOMAS J. SLOYAN, *Assistant Examiner.*

U.S. Cl. X.R.

235—61.11; 250—217, 219; 315—10